United States Patent
Barsness et al.

(10) Patent No.: US 7,296,013 B2
(45) Date of Patent: Nov. 13, 2007

(54) REPLACING AN UNAVAILABLE ELEMENT IN A QUERY

(75) Inventors: Eric Lawrence Barsness, Pine Island, MN (US); Randy William Ruhlow, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 497 days.

(21) Appl. No.: 10/753,514

(22) Filed: Jan. 8, 2004

(65) Prior Publication Data

US 2005/0154709 A1 Jul. 14, 2005

(51) Int. Cl.
*G06F 7/00* (2006.01)
(52) U.S. Cl. .......................................... 707/4
(58) Field of Classification Search .................. 707/3, 707/4
See application file for complete search history.

(56) References Cited

U.S. PATENT DOCUMENTS

| | | | |
|---|---|---|---|
| 2004/0199553 A1* | 10/2004 | Byrne et al. | 707/204 |
| 2005/0034124 A1* | 2/2005 | House et al. | 718/100 |
| 2005/0038781 A1* | 2/2005 | Ferrari et al. | 707/4 |
| 2005/0131872 A1* | 6/2005 | Calbucci et al. | 707/3 |

* cited by examiner

*Primary Examiner*—Don Wong
*Assistant Examiner*—Angela M Lie
(74) *Attorney, Agent, or Firm*—Owen J. Gamon

(57) ABSTRACT

A method, apparatus, system, and signal-bearing medium that in an embodiment replace an element in a query with a backup if the element is not available, but the backup is available. An element may also be removed from the query if the element is not required. In various embodiments, the element may be a table or a user-defined function. In this way, the query may still execute even if the element is not available.

12 Claims, 7 Drawing Sheets

REPLACING AN UNAVAILABLE ELEMENT IN A QUERY

FIELD

An embodiment of the invention generally relates to computers. In particular, an embodiment of the invention generally relates to queries to databases.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs.

One important use of computer systems is for retrieving data from a database, which is a set of related files. A database management system (DBMS) creates and manages one or more databases. Today, database management systems can manage any form of data including text, images, sound, and video. Further, large-scale integrated database management systems provide an efficient, consistent, and secure means for storing and retrieving the vast amounts of data.

Many new interfaces are being created that allow the joining of data from across a variety of databases. The databases can be homogeneous, heterogeneous, or federated databases, which cooperate to share a processing load. At times, when using these interfaces, a query to the databases cannot be completed because a table or user-defined function participating in the query is unavailable. This can occur when one of the federated databases or a link to an external data source is simply unavailable. For example, the table or user-defined function may be unavailable because the communications link to the server hosting the data is down or the server itself is off-line or is busy with a save or restore operation.

There are also times when one of the tables being queried or one of the user-defined functions being executed will cause the query to take too long to execute, or even last forever. This could be the case if the system hosting the data is too busy, the data set in question is too large, or simply the access path, query method, or user-defined function is too time consuming.

There are also times when the end user would still find the data useful even if one of the tables or user-defined functions is not available. For example, if the user requests a join of multiple files with a history file, which is used to retrieve data from a date field, then the query results, even without the date from the history file, might still be valuable. In other words, some of the information being joined together, although relevant, is either non-essential or non-critical. Unfortunately, in current database management systems, if all of the information is not available, no information is returned to the user.

Without a better way to handle tables and user-defined functions that are unavailable or too slow, the computer industry will not be able to fully take advantage of joins of data from multiple sources.

SUMMARY

In an embodiment, a method is provided, comprising: determining whether an element in a query is available; determining whether a backup for the element is available; and if the element is not available and the backup is available, replacing the element in the query with the backup.

In another embodiment, an apparatus is provided, comprising: means for determining whether a first element in a first query is available; means for determining whether a first backup for the first element is available; means for replacing the first element in the first query with the first backup if the first element is not available and the first backup is available; and means for removing the first element from the first query if the first element is not required, the first element is not available, and the first backup is not available.

In another embodiment, a signal-bearing medium is provided, wherein the signal-bearing medium is encoded with instructions, wherein the instructions when executed comprise: determining whether a first element in a first query is available; determining whether a first backup for the first element is available; replacing the first element in the first query with the first backup if the first element is not available and the first backup is available; removing the first element from the first query if the first element is not required, the first element is not available, and the first backup is not available; and determining whether an elapsed time for the first query exceeds a threshold.

In another embodiment, a computer system is provided, comprising: a processor; and a main memory encoded with instructions, wherein the instructions when executed on the processor comprise: determining whether a first element in a first query is available, determining whether a first backup for the first element is available, replacing the first element in the first query with the first backup if the first element is not available and the first backup is available, removing the first element from the first query if the first element is not required, the first element is not available, and the first backup is not available, and creating a second query with a second backup substituted for a second element if an elapsed time for the first query exceeds a threshold.

DETAILED DESCRIPTION

Figure 1:
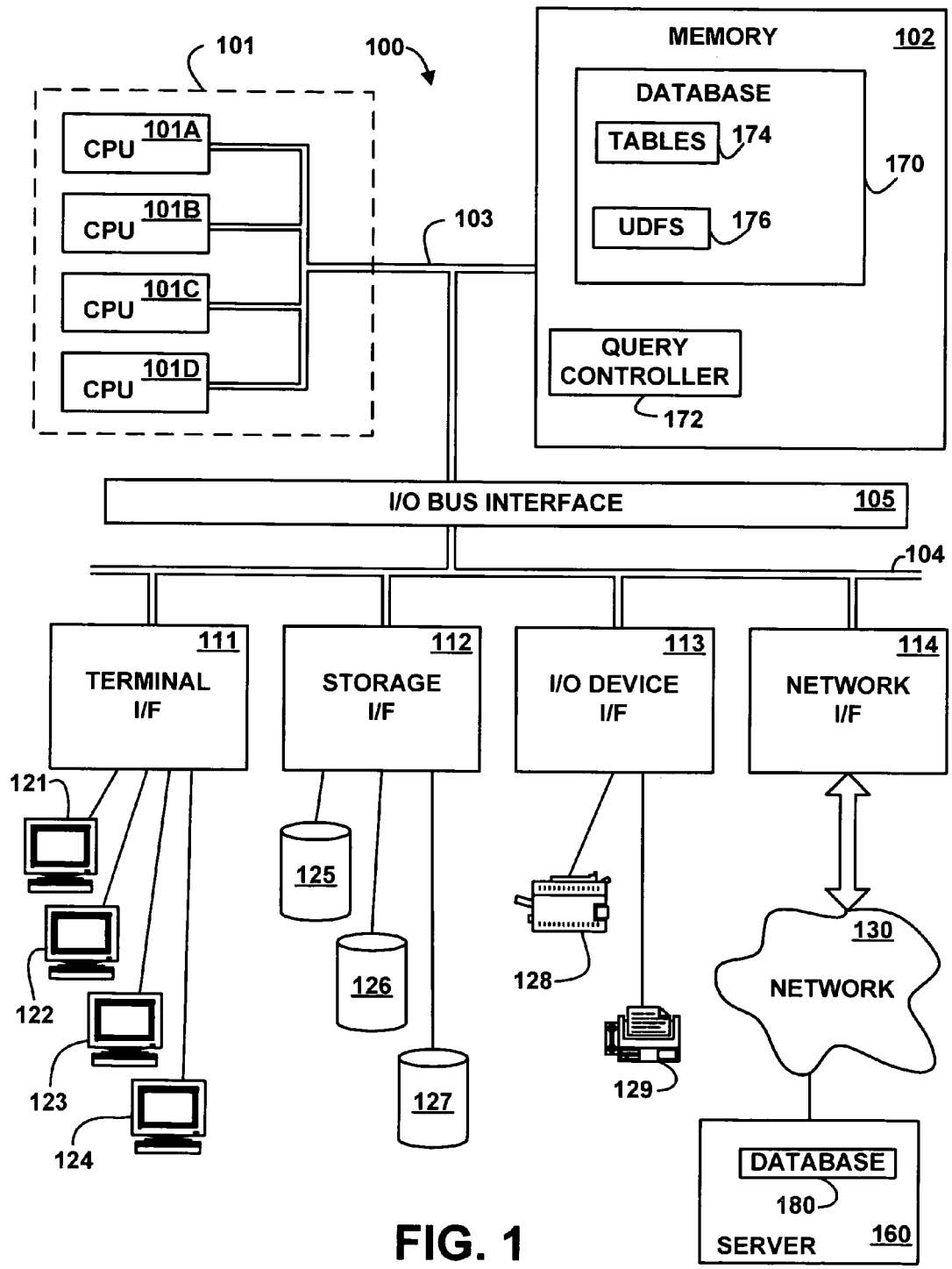
FIG. 1 depicts a block diagram of an example system for implementing an embodiment of the invention.

Referring to the Drawing, wherein like numbers denote like parts throughout the several views, FIG. 1 depicts a high-level block diagram representation of a computer system 100 connected to a server 160, according to an embodiment of the present invention. The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may further be distributed and associated with different CPUs or sets of CPUs, as is known in any of various so-called non-uniform memory access (NUMA) computer architectures.

The memory 102 includes a database 170 and a query controller 172. Although the database 170 and the query controller 172 are illustrated as being contained within the memory 102 in the computer system 100, in other embodiments either or both may be on different computer systems and may be accessed remotely, e.g., from the server 160 via the network 130. The computer system 100 may use virtual addressing mechanisms that allow the programs of the computer system 100 to behave as if they only have access to a large, single storage entity instead of access to multiple, smaller storage entities. Thus, while the database 170 and the query controller 172 are illustrated as residing in the memory 102, these elements are not necessarily all completely contained in the same storage device at the same time.

The database 170 may include tables 174 and/or user-defined functions 176. In an embodiment, a table 174 is a predefined format of rows and columns, which defines an entity. A row consists of one set of attributes (or one tuple) corresponding to one instance of the entity that a table schema describes. An attribute is a single data item related to a database object. The database schema associates one or more attributes with each database entity. Columns correspond to the attributes of the object.

A user-defined function is a function or method for manipulating data. The user-defined function is typically written independently from and without knowledge of the underlying database management system. In SQL (Structured Query Language), user-defined functions allow client applications to define functions that operate or manipulate the values of abstract data type (ADT) object data instances. Two general types of user-defined functions are possible in SQL SELECT queries: projection user-defined functions and predicate expression user-defined functions. Predicate user-defined functions return either: (1) boolean values which are used as partial search conditions, (2) an expression value used to evaluate a boolean expression, or (3) an object used by another user-defined function. Projection user-defined functions operate, manipulate, and/or modify objects that satisfied the query predicate for viewing or other client application uses. Other user-defined function uses include: (1) updating or modifying existing objects; (2) feature extraction and pattern matching; (3) converting from one data type to another (e.g., converting from MPEG-2 (Moving Picture Experts Group-2) to MPEG-4); (4) partial extraction (i.e. retrieve audio track from video); and (5) many other information extraction operations that "information mine" (multimedia) complex data.

SQL is a language used to interrogate and process data in a relational database (a database in which relationships are established between files and information stored in the database). Originally developed for mainframes, most database systems designed for client/sever environments support SQL. SQL commands can be used to interactively work with a database or can be embedded within a programming language to interface to a database. But, user-defined functions are not limited to SQL, and in other embodiments any appropriate language may be used.

In an embodiment, the query controller 172 includes instructions capable of executing on the processors 101 or statements capable of being interpreted by instructions executing on the processors 101 to display and process the user interface, as further described below with reference to FIG. 2, and to perform the functions as further described below with reference to FIGS. 3, 4, 5, 6, and 7. In another embodiment, the query controller 172 may be implemented in microcode. In another embodiment, the query controller 172 may be implemented in hardware via logic gates and/or other appropriate hardware techniques in lieu of or in addition to a processor-based system.

The memory bus 103 provides a data communication path for transferring data among the processors 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI (Peripheral Component Interconnect) bus, or any other appropriate bus technology. The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The I/O and other device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol). In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number of networks (of the same or different types) may be present.

Although the memory bus 103 is shown in FIG. 1 as a relatively simple, single bus structure providing a direct communication path among the processors 101, the main memory 102, and the I/O bus interface 105, in another embodiment the memory bus 103 may comprise multiple different buses or communication paths, which may be arranged in any of various forms, such as point-to-point links in hierarchical, star or web configurations, multiple hierarchical buses, parallel and redundant paths, etc. Furthermore, while the I/O bus interface 105 and the I/O bus 104 are shown as single respective units, in other embodiments the computer system 100 may contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

It should be understood that FIG. 1 is intended to depict the representative major components of the computer system 100 at a high level, that individual components may have greater complexity that represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements embodying the various aspects of an embodiment of the invention.

Moreover, while embodiments of the invention have and hereinafter will be described in the context of fully functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of signal-bearing media, which include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 125, 126, or 127) or diskette; or (3) information conveyed to the computer system 100 by a communications medium, such as through a computer or a telephone network, e.g., the network 130, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
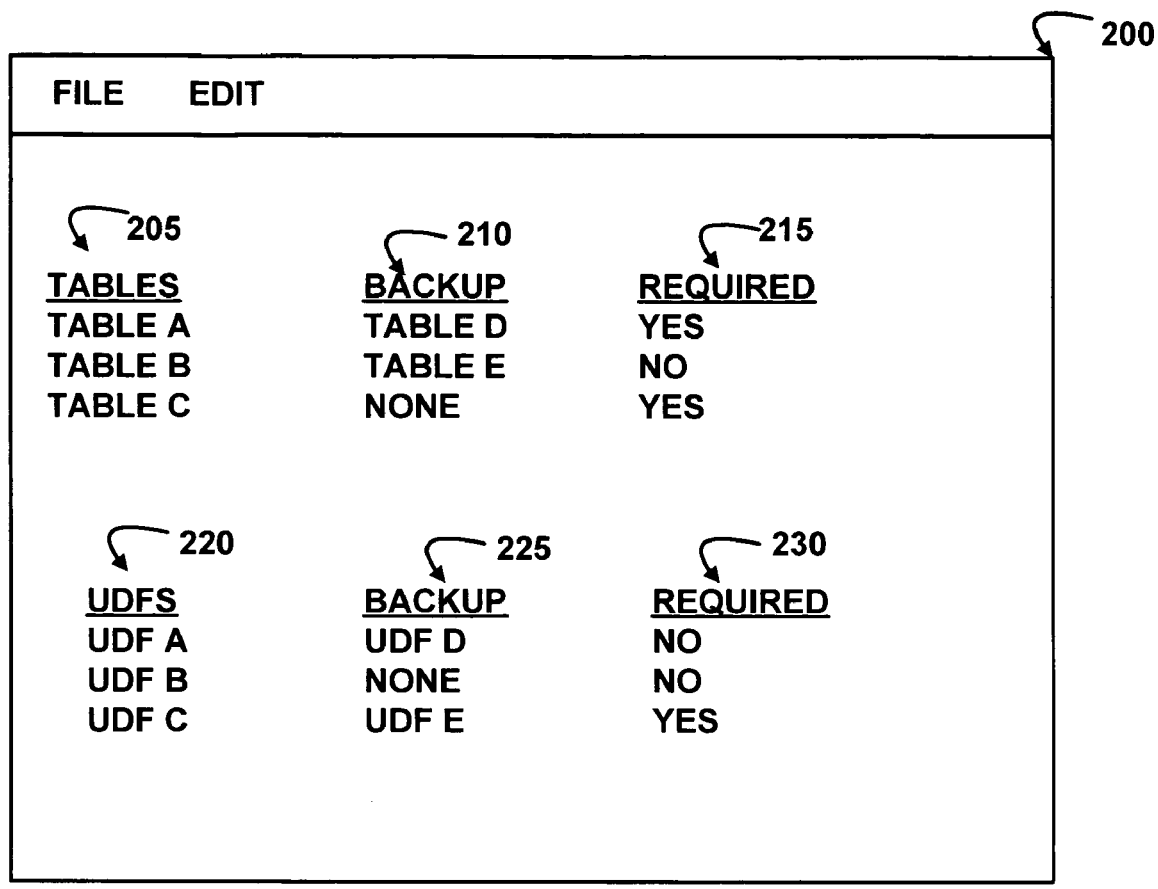
FIG. 2 depicts a pictorial representation of a user interface, according to an embodiment of the invention.

FIG. 2 depicts a pictorial representation of a user interface 200, according to an embodiment of the invention. The user interface 200 allows the user to specify whether for each of the respective tables 205, a respective backup table 210 exists, and whether the respective table 205 or its respective backup table 210 are required 215. Some or all of the tables specified in the tables 205 may exist in the tables 174 (FIG. 1) while some or all of the tables specified by the backup tables 210 may exist on another system, such as in the database 180 on the server 160. But, in other embodiments, some or all of the tables specified by the tables 205 and the backup tables 210 may exist in the same database or on the same system. The query controller 172 uses the specification in the tables 205, the backup tables 210, and the required field 215 as further described below with reference to FIGS. 3, 4, 5, 6, and 7.

The user interface 200 further allows the user to specify whether for each of the respective user-defined functions 220, a respective backup user-defined function 225 exists, and whether the respective user-defined function 220 or its respective backup user-defined function 225 are required ("yes") or optional ("no") via the required field 230. Some or all of the user-defined functions specified in the user-defined functions 220 may exist in the user-defined functions 176 (FIG. 1) while some or all of the user-defined functions specified by the backup user-defined functions 225 may exist on another system, such as in the database 180 on the server 160. But, in other embodiments, some or all of the user-defined functions specified by the user-defined functions 220 and the backup user-defined functions 225 may exist in the same database or on the same system. The query controller 172 uses the specification in the user-defined functions 220, the backup user-defined functions 225, and the required field 230 as further described below with reference to FIGS. 3, 4, 5, 6, and 7.

In other embodiments, the user interface 200 may include more or fewer elements than are shown in FIG. 2. For example, in an embodiment, the tables 205, the backup tables 210, and the required field 215 may be optional or not present. In another embodiment, the user-defined functions 220, the backup user-defined functions 225, and the required field 230 may be optional or not present. Further, the data illustrated in FIG. 2 is exemplary only, and in other embodiments any appropriate type or amount of data may be present.

Figure 3:
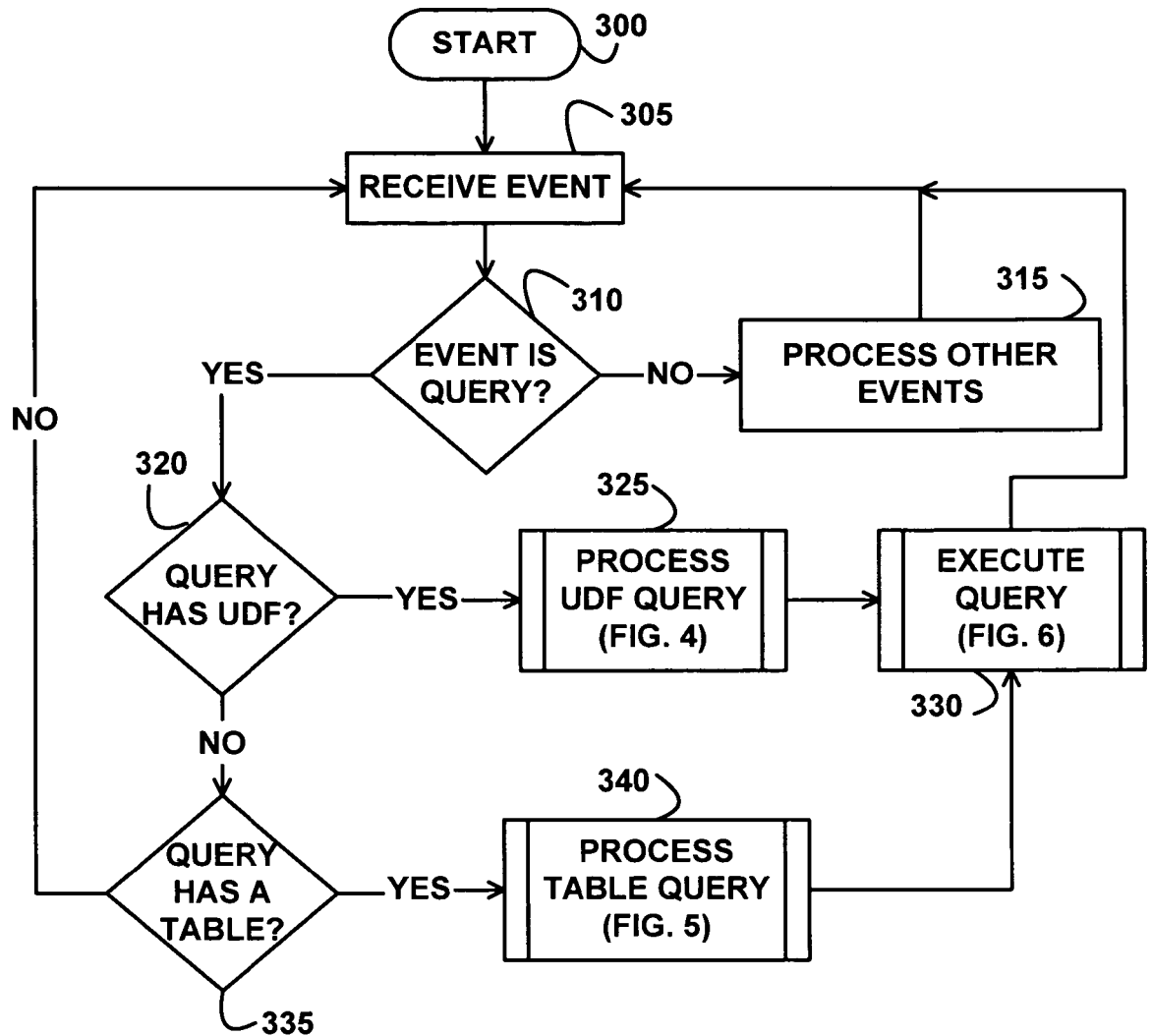
FIG. 3 depicts a flowchart of example processing for a function in a query controller that processes events, according to an embodiment of the invention.

FIG. 3 depicts a flowchart of example processing for a function in the query controller 172 that processes events, according to an embodiment of the invention. Control begins at block 300. Control then continues to block 305 where the query controller 172 receives an event. Control then continues to block 310 where the query controller 172 determines whether the event previously received at block 305 is a query event, indicating that a query to the database 170 has been received. The query may include multiple elements, such as tables and/or user-defined functions. These elements may exist on the same or on different systems.

If the determination at block 310 is true, then the event received at block 305 was a query event, so control continues to block 320 where the query controller 172 determines whether the query received has an associated user-defined function. If the determination at block 320 is true, then the query has an associated user-defined function, so control continues from block 320 to block 325 where the query controller 172 processes the query with the user-defined function, as further described below with reference to FIG. 4. Control then continues to block 330 where the query controller 172 executes the query, as further described below with reference to FIG. 6. Control then returns to block 305, as previously described above.

If the determination at block 320 is false, then the query does not have an associated user-defined function, so control continues from block 320 to block 335 where the query controller 172 determines whether the query has an associated table. If the determination at block 335 is true, then the query has an associated table, so control continues to block 340 where the query controller 172 processes the query with the associated table, as further described below with reference to FIG. 5. Control then continues to block 330 where the query controller 172 executes the query, as further described below with reference to FIG. 6. Control then returns to block 305, as previously described above.

If the determination at block 335 is false, then the query does not have an associated table, so control returns from block 335 to block 305, as previously described above.

If the determination at block 310 is false, then the received event is not a query, so control continues to block 315 where the query controller 172 processes any other events. Control then returns to block 305, as previously described above.

Figure 4:
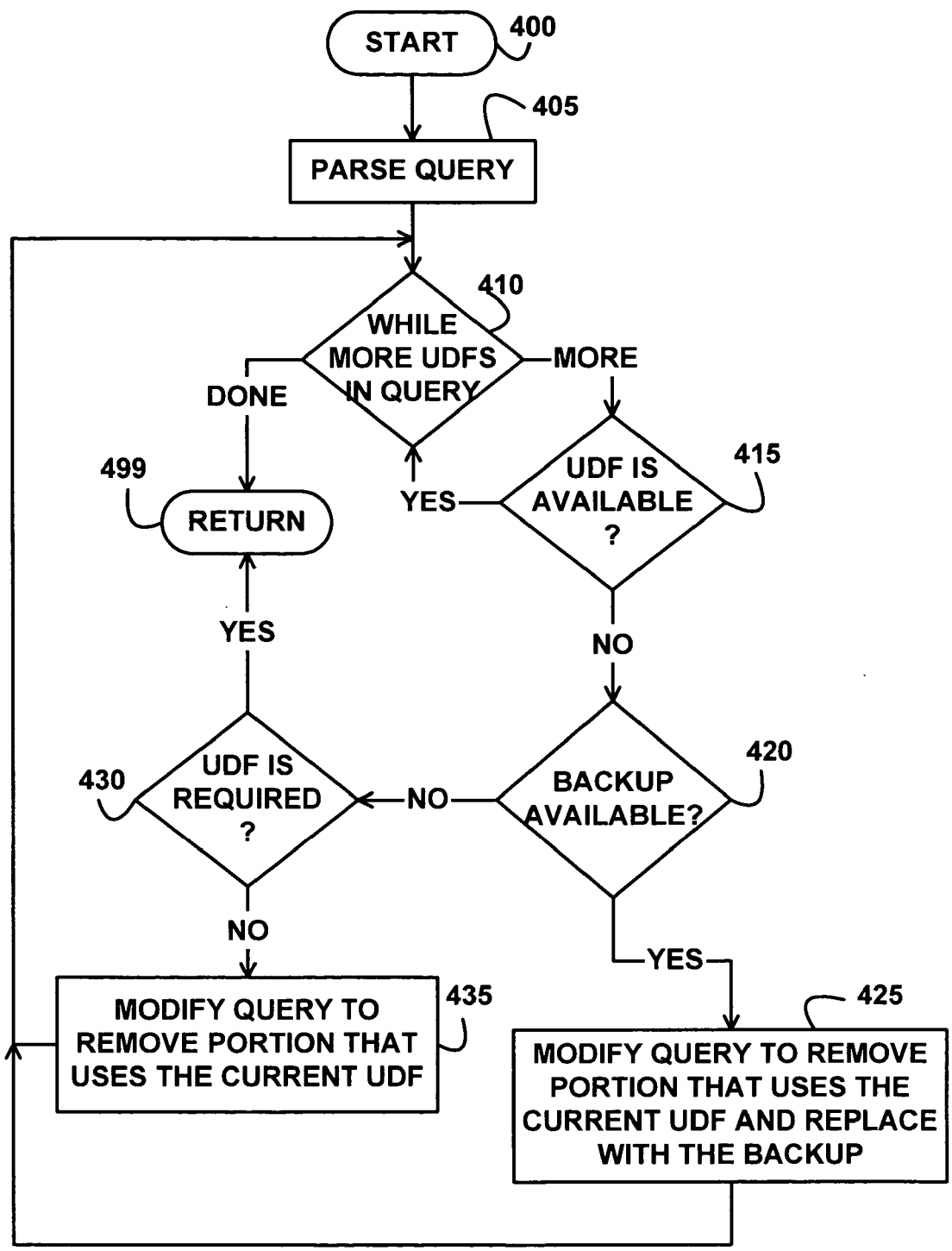
FIG. 4 depicts a flowchart of example processing for a function in the query controller that processes queries with user-defined functions, according to an embodiment of the invention.

FIG. 4 depicts a flowchart of example processing in the query controller 172 for a query with an associated user-defined function, according to an embodiment of the invention. Control begins at block 400. Control then continues to block 405 where the query controller 172 parses the query. Control then continues to block 410 where the query controller 172 determines whether any unprocessed user-defined functions remain in the query. While the query still has associated unprocessed user-defined functions, control continues from block 410 to block 415 where the query controller 172 determines whether the current user-defined function is available. In an embodiment, a user-defined function is available if the query controller 172 can find and access the user-defined function. If the determination at block 415 is true, then the current user-defined function is available, so control returns to block 410 as previously described above.

If the determination at block 415 is false, then the current user-defined function is not available, so control continues to block 420 where the query controller 172 determines whether a backup user-defined function associated with the current user-defined function is available. The query controller 172 makes the determination at block 420 by, e.g., examining the input from the backup field 225 (FIG. 2) to determine whether a backup user-defined function is specified for the current user-defined function and then determining whether that backup user-defined function is accessible. The backup user-defined function may be on the same or a different system as the current user-defined function.

If the determination at block 420 is true, then a backup user-defined function is specified and available, so control continues to block 425 where the query controller 172 modifies the query to remove the portion of the query that uses the current user-defined function and replaces that portion with the backup user-defined function specified in the backup field 225. Control then returns to block 410, as previously described above.

If the determination at block 420 is false, then a backup user-defined function is not available, so control continues to block 430 where the query controller 172 determines whether the current user-defined function is required by examining the input from the required field 230. If the determination at block 430 is true, then the user-defined function is required by the query, so control continues to block 499 where the logic of FIG. 4 returns.

If the determination at block 430 is false, then the user-defined function is not required by the query, so control continues to block 435 where the query controller 172 modifies the query to remove the portion that uses the current user-defined function. Control then returns to block 410, as previously described above.

When no more unprocessed user-defined functions remain in the query, control continues from block 410 to block 499 where the logic of FIG. 4 returns.

Figure 5:
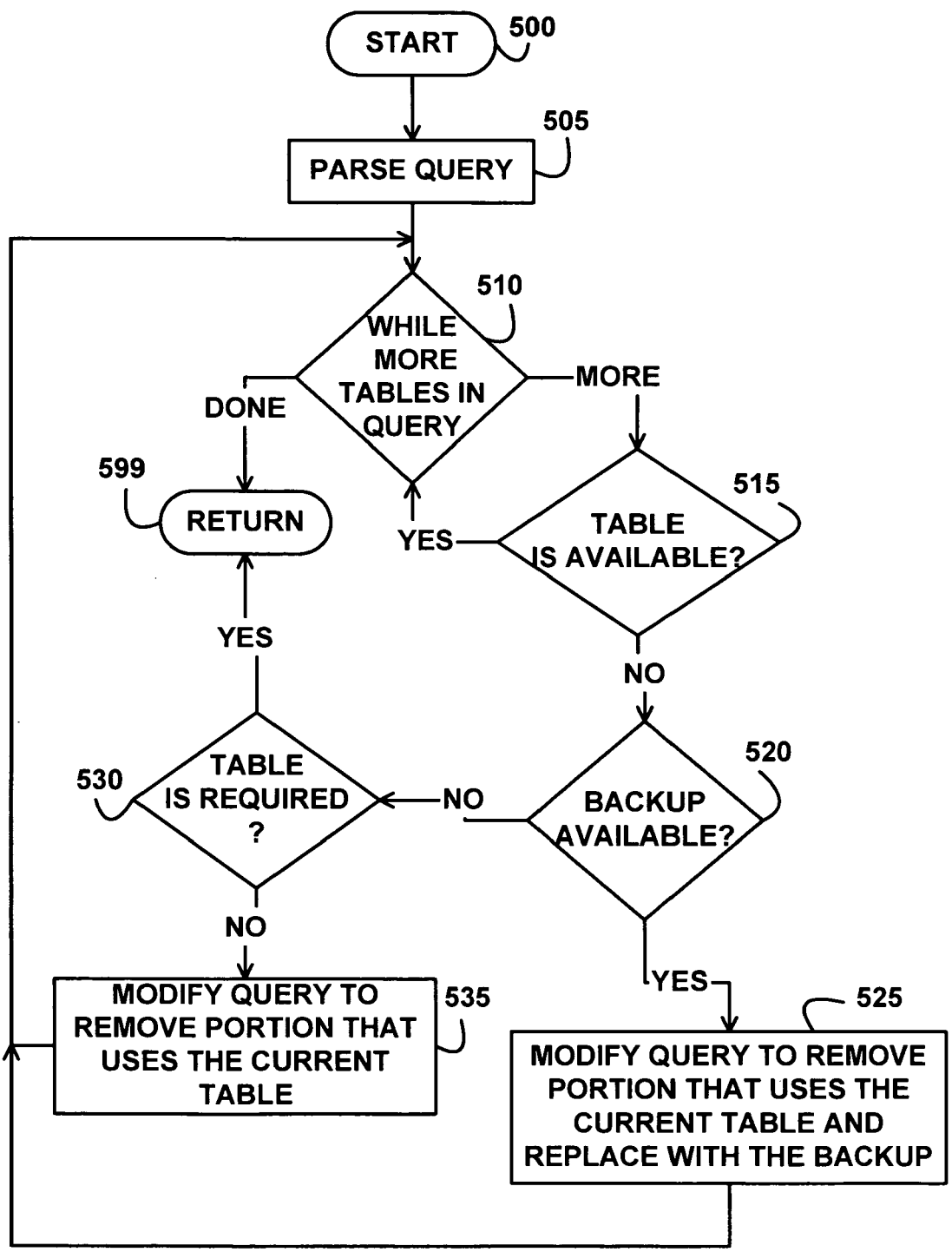
FIG. 5 depicts a flowchart of example processing for a function in the query controller that processes queries with tables, according to an embodiment of the invention.

FIG. 5 depicts a flowchart of example processing in the query controller 172 for a query with an associated table, according to an embodiment of the invention. Control begins at block 500. Control then continues to block 505 where the query controller 172 parses the query. Control then continues to block 510 where the query controller 172 determines whether any unprocessed tables remain in the query. While the query still has associated unprocessed tables, control continues from block 510 to block 515 where the query controller 172 determines whether the current table is available. In an embodiment, a table is available if the query controller 172 can find and access the table. If the determination at block 515 is true, then the current table is available, so control returns to block 510 as previously described above.

If the determination at block 515 is false, then the current table is not available, so control continues to block 520 where the query controller 172 determines whether a backup table associated with the current table is available. The query controller 172 makes the determination at block 520 by, e.g., examining the input from the backup field 210 (FIG. 2) to determine whether a backup table associated with the current table is specified and then determining whether the backup table is accessible. The backup table may be on the same or a different system as the current table.

If the determination at block 520 is true, then a backup table is specified and available, so control continues to block 525 where the query controller 172 modifies the query to remove the portion of the query that uses the current table and replaces that removed portion with the backup table specified in the backup field 210. Control then returns to block 510, as previously described above.

If the determination at block 520 is false, then a backup table is not available, so control continues to block 530 where the query controller 172 determines whether the current table is required by examining the input from the required field 215. If the determination at block 530 is true, then the table is required by the query, so control continues to block 599 where the logic of FIG. 5 returns.

If the determination at block 530 is false, then the table is not required by the query, so control continues to block 535 where the query controller 172 modifies the query to remove the portion of the query that uses the current table. Control then returns to block 510, as previously described above.

When no more unprocessed tables remain in the query, control continues from block 510 to block 599 where the logic of FIG. 5 returns.

Figure 6:
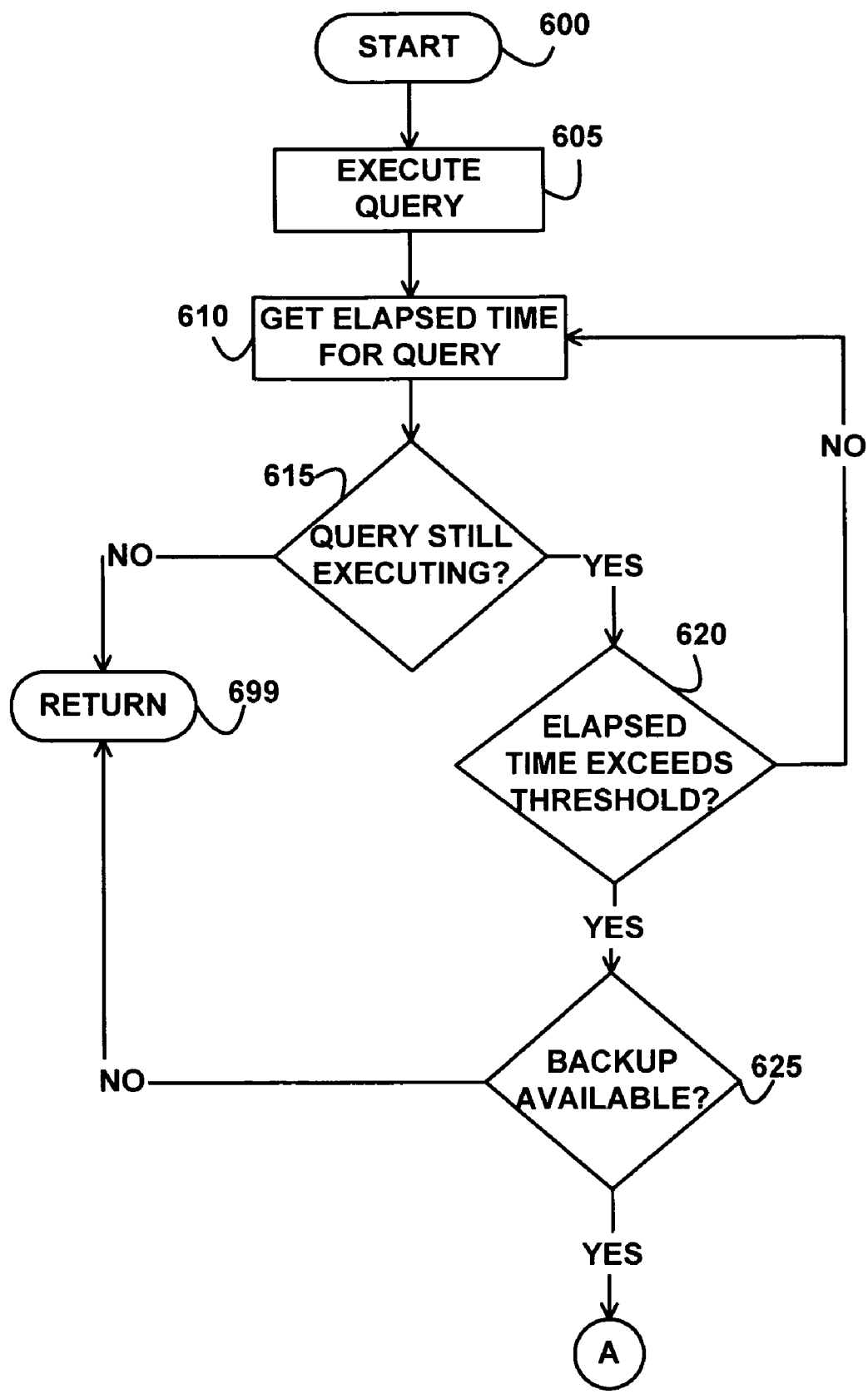
FIG. 6 depicts a flowchart of example processing for a function in the query controller that executes queries, according to an embodiment of the invention.

FIG. 6 depicts a flowchart of example processing for an execute query function in the query controller 172, according to an embodiment of the invention. Control begins at block 600. Control then continues to block 605 where the query controller 172 submits the query for execution to the database 170. Control then continues to block 610 where the query controller 172 determines the time that has elapsed since the query started. Control then continues to block 615 where the query controller 172 determines whether the query is still executing. If the determination at block 615 is true, then the query is still executing, so control continues from block 615 to block 620 where the query controller 172 determines whether the elapsed time for the query exceeds a threshold.

If the determination at block 620 is true, then the elapsed time for the query exceeds the threshold, so control continues from block 620 to block 625 where the query controller 172 determines whether a backup is available for a table or user-defined function associated with the query via the backup fields 210 or 225 (FIG. 2). Although the backup determination may have been previously made in FIGS. 4 and 5, the availability of the backup may have changed since then. If the determination at block 625 is false, then a backup is not available, so control continues from block 625 to block 699 where the logic of FIG. 6 returns.

Figure 7:
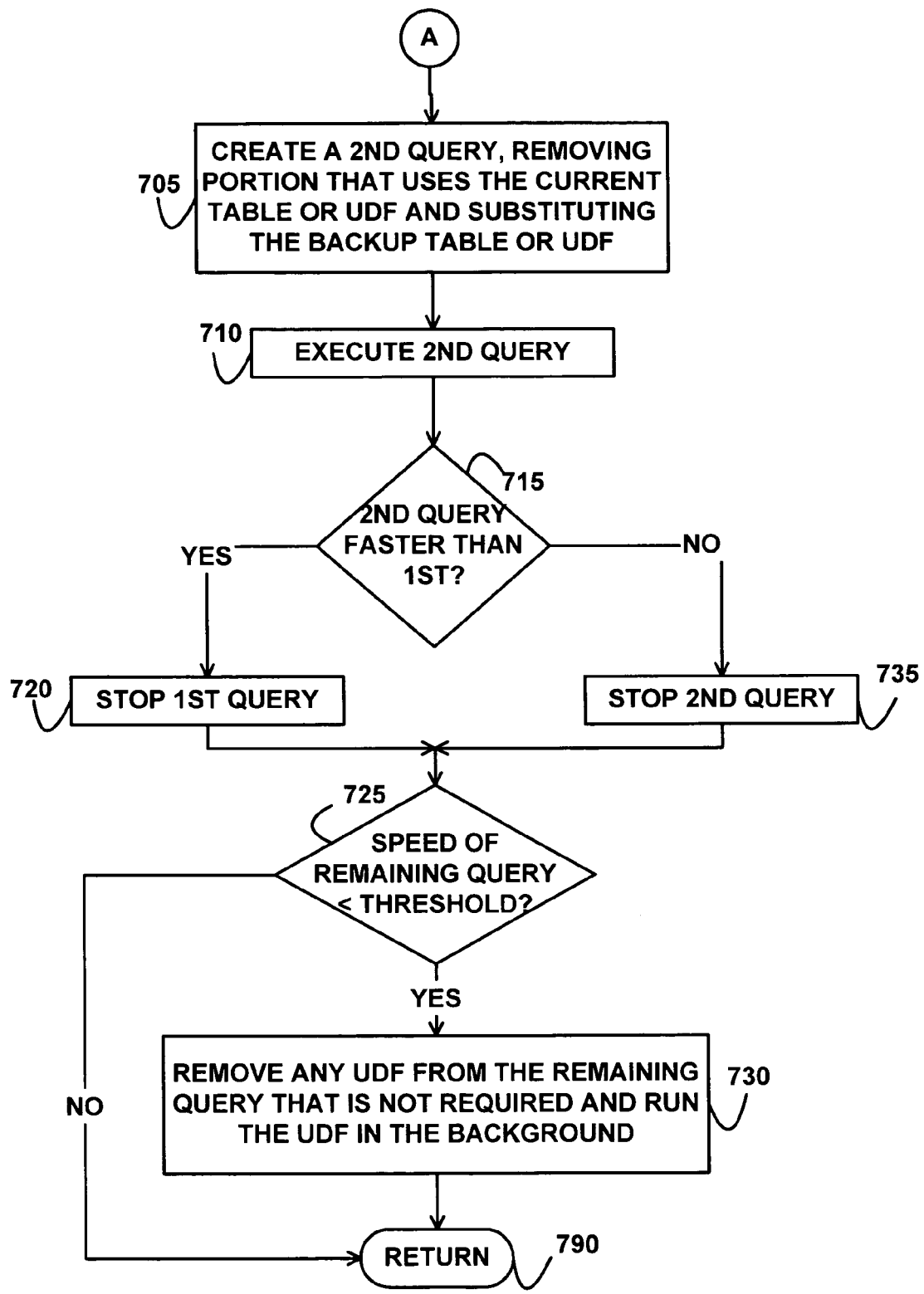
FIG. 7 depicts a flowchart of example further processing for the function in the query controller that executes queries, according to an embodiment of the invention.

If the determination at block 625 is true, then a backup does exist and is accessible for a table or user-defined function associated with the query, so control continues from block 625 in FIG. 6 to block 705 in FIG. 7 where the query controller 172 creates a second query based on the first query, removing the portion of the first query that uses the table or user-defined function that was previously determined to have a backup (at block 625) and replacing therewith the backup table (specified by the backup field 210) or user-defined function (specified by the backup field 225).

Control then continues to block 710 where the query controller 172 submits the second query to the database 170 for execution. Control then continues to block 715 where the query controller 172 determines whether the second query is executing faster than the first query. If the determination at block 715 is true, then the second query is executing faster than the first query, so control continues to block 720 where the query controller 172 stops the first query from executing. Control then continues to block 725 where the query controller 172 determines whether the speed of the remaining query is less than a threshold. If the determination at block 725 is true then the speed of the remaining query is less than the threshold, so control continues to block 730 where the query controller 172 removes any user-defined function from the remaining query that is not required (based on the required field 230) and runs the user-defined query in a background mode. Control then continues to block 790 where the logic of FIG. 7 returns.

If the determination at block 725 is false, then the speed of the remaining query is not less than the threshold, so control continues to block 790 where the logic of FIG. 7 returns.

If the determination at block 715 is false, then the second query is not faster than the first query, so control continues to block 735 where the query controller 172 stops the second query from executing. Control then continues to block 725, as previously described above.

If the determination at block 620 in FIG. 6 is false, then the elapsed time for the query does not exceed the threshold, so control returns from block 620 to block 610, as previously described above.

If the determination at block 615 is false, then the query is not still executing, so control continues from block 615 to block 699 where the logic of FIG. 6 returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. An apparatus comprising:
   means for receiving a first query that comprises a specification of a first element, wherein the first element comprises a user-defined function, wherein the user-defined function comprises a method that manipulates an object data instance;
   means for determining whether the first element is available;
   means for determining whether a first backup for the first element is available;
   means for replacing the specification of the first element in the first query with a specification of the first backup if the first element is not available and the first backup is available;
   means for refraining from replacing the specification of the first element if the first element is available or the first backup is not available;
   means for removing the specification of the first element from the first query if the first element is specified by a user as not required, the first element is not available, and the first backup is not available;
   means for refraining from removing the specification of the first element if the first element is specified by the user as required, the first element is available, or the first backup is available; and
   means for executing the first query, which returns results.

2. The apparatus of claim 1, wherein the first element comprises a table.

3. The apparatus of claim 1, further comprising:
   means for determining whether an elapsed time for the first query exceeds a threshold.

4. The apparatus of claim 3, further comprising:
   means for creating a second query with a second backup substituted for a second element if the elapsed time exceeds the threshold.

5. A storage medium encoded with instructions, wherein the instructions when executed comprise:
   receiving a first query that comprises a specification of a first element, wherein the first element comprises a user-defined function, wherein the user-defined function comprises a method that manipulates an object data instance;
   determining whether the first element is available;
   determining whether a first backup for the first element is available;
   replacing the specification of the first element in the first query with a specification of the first backup if the first element is not available and the first backup is available;
   refraining from replacing the specification of the first element if the first element is available or the first backup is not available;
   removing the specification of the first element from the first query if the first element is specified by a user as not required, the first element is not available, and the first backup is not available;
   refraining from removing the specification of the first element if the first element is specified by the user as required, the first element is available, or the first backup is available;
   executing the first query, which returns results; and
   determining whether an elapsed time for the first query exceeds a threshold.

6. The storage medium of claim 5, wherein the first element comprises a table.

7. The storage medium of claim 5, further comprising:
   creating a second query with a second backup substituted for a second element if the elapsed time exceeds the threshold.

8. The storage medium of claim 7, further comprising:
   determining whether the second query is executing faster than the first query.

9. A computer system comprising:
   a processor; and
   a main memory encoded with instructions, wherein the instructions when executed on the processor comprise:
      receiving a first query that comprises a specification of a first element, wherein the first element comprises a user-defined function, wherein the user-defined function comprises a method that manipulates an object data instance,
      determining whether the first element is available,
      determining whether a first backup for the first element is available,
      replacing the specification of the first element in the first query with a specification of the first backup if the first element is not available and the first backup is available,
      refraining from replacing the specification of the first element if the first element is available or the first backup is not available,
      removing the first element from the first query if the first element is specified by a user as not required, the first element is not available, and the first backup is not available,
      refraining from removing the first element from the first query if the first element is specified by a user as required, the first element is available, or the first backup is available,
      executing the first query, which returns results,
      creating a second query with a second backup substituted for a second element if an elapsed time for the first query exceeds a threshold, and
      refraining from creating the second query if the elapsed time for the first query does not exceed the threshold.

10. The computer system of claim 9, wherein the first element comprises a table.

11. The computer system of claim 9, wherein the instructions further comprise:
    stopping whichever of the first query and the second query is slower.

12. The computer system of claim 11, wherein the instructions further comprise:
    removing a user-defined function that is not required from whichever of the first query and the second query remains; and
    running the user-defined function in a background mode.

* * * * *